United States Patent
Tamanoi (10) Patent No.: US 6,821,642 B2
(45) Date of Patent: Nov. 23, 2004

(54) MAGNETO-OPTICAL RECORDING MEDIUM WITH FIRST AND SECOND MAGNETIC LAYERS WITH ALMOST EQUAL CURIE TEMPERATURES

(75) Inventor: Ken Tamanoi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 57 days.

(21) Appl. No.: 09/963,004

(22) Filed: Sep. 25, 2001

(65) Prior Publication Data

US 2002/0177010 A1 Nov. 28, 2002

(30) Foreign Application Priority Data

May 25, 2001 (JP) ........................................ 2001-157148

(51) Int. Cl.$^7$ ............................................ G11B 11/105
(52) U.S. Cl. ...................... 428/636; 428/212; 428/409; 428/694 RL; 428/694 RE; 428/694 MM; 428/694 EC; 369/13.42; 369/13.07
(58) Field of Search ......................... 369/13.06, 13.07, 369/13.08, 13.09, 13.42, 13.46, 13.55; 428/636, 212, 409, 694 DE, 694 MT, 694 RE, 694 RL, 694 MM, 694 EC (56) References Cited

U.S. PATENT DOCUMENTS

| | | | | |
|---|---|---|---|---|
| 5,843,570 A | * | 12/1998 | Miyazawa et al. | .......... 428/332 |
| 5,889,739 A | * | 3/1999 | Nishimura et al. | ...... 369/13.07 |
| 5,932,364 A | * | 8/1999 | Hirokane et al. | ..... 428/694 ML |
| 6,027,825 A | * | 2/2000 | Shiratori et al. | ...... 428/694 ML |
| 6,031,793 A | * | 2/2000 | Yoshinari et al. | ........ 369/13.38 |
| 6,117,544 A | * | 9/2000 | Hirokane et al. | ........... 428/336 |
| 6,118,736 A | * | 9/2000 | Takahashi et al. | ....... 369/13.43 |
| 6,124,048 A | * | 9/2000 | Becker | ............... 428/694 MM |
| 6,261,707 B1 | * | 7/2001 | Murakami et al. | ... 428/694 ML |
| 6,356,516 B2 | * | 3/2002 | Tamanoi et al. | ............ 428/332 |
| 2002/0141294 A1 | * | 10/2002 | Chen | ....................... 369/13.36 |

FOREIGN PATENT DOCUMENTS

| | | |
|---|---|---|
| EP | 0 821 354 A2 | 1/1998 |
| EP | 0 822 547 A2 | 2/1998 |
| EP | 0 965 987 A2 | 12/1999 |
| EP | 0 997 894 A1 | 5/2000 |
| JP | 2000-200448 | 7/2000 |

\* cited by examiner

*Primary Examiner*—Paul Thibodeau
*Assistant Examiner*—Kevin M. Bernatz
(74) *Attorney, Agent, or Firm*—Greer, Burns & Crain, Ltd.

(57) ABSTRACT

A magneto-optical recording medium includes at least three magnetic layers of a first magnetic layer, a second magnetic layer and a third magnetic layer, in which a recording mark recorded in the third magnetic layer by irradiation of a light beam is transferred through the second magnetic layer formed above the third magnetic layer to the first magnetic layer formed above the second magnetic layer for reproduction, wherein the first magnetic layer is provided with a high temperature mask having no spontaneous magnetization in a region where its temperature becomes a predetermined temperature or higher.

17 Claims, 10 Drawing Sheets

| | COMPOSITION | CURIE TEMPERATURE | COMPENSATION TEMPERATURE |
|---|---|---|---|
| FIRST MAGNETIC LAYER | Gd21.0Fe55.9Co14.4Cr8.7 | 210°C | 90°C |
| SECOND MAGNETIC LAYER | Gd28.5Fe65.1Co4.3Si2.2 | 210°C | — |
| THIRD MAGNETIC LAYER | Tb22.3Fe61.4Co16.3 | 340°C | R.T. |

(SUBSTRATE OF A TRACK PITCH OF 0.65 μm)

REPRODUCTION POWER

FIG. 13 (Prior Art)

(SUBSTRATE OF A TRACK PITCH OF 0.50 μm)

REPRODUCTION POWER

FIG. 14 (Prior Art)

FIG. 15 (a) (Prior Art)
NARROW TRACK PITCH

FIG. 15 (b) (Prior Art)
WIDE TRACK PITCH

MAGNETO-OPTICAL RECORDING MEDIUM WITH FIRST AND SECOND MAGNETIC LAYERS WITH ALMOST EQUAL CURIE TEMPERATURES

CROSS-REFERENCE TO RELATED APPLICATION

This application is related to Japanese Patent Application No. 2001-157148 filed in May 25, 2001, whose priority is claimed under 35 USC §119, the disclosure of which is incorporated by reference in its entirety.

BACKGROUND OF THE INVENTION

1. Field of the Invention

The present invention relates to a magneto-optical recording medium, and particularly to a magneto-optical recording medium which can perform magnetically induced super resolution reproduction.

2. Description of the Related Art

In order to increase recording density, a magneto-optical recording medium has been developed which is provided with a recording mark having a mark length shorter than a spot diameter of a laser beam and formed at a period shorter than the spot diameter.

Particularly, a magnetically induced super resolution (MSR) reproduction method is proposed as a method of reproducing a recording mark smaller than a spot diameter of a beam.

In this method, a laser light for reproduction is irradiated while a magneto-optical disk in which a plurality of magnetic layers including a recording layer and a reproduction layer are stacked is rotated, so that a temperature distribution is produced in a circumferential direction of the magneto-optical disk, and a small recording mark is read out by using this temperature distribution. By this, resolution equivalent to the case where reproduction is substantially made with a light spot smaller than a spot diameter of the reproduction laser light can be obtained.

Besides, as a medium capable of reproducing recording marks recorded at a period shorter than a beam spot by using the magnetically induced super resolution, a magnetically induced super resolution medium constituted by three magnetic layers having predetermined characteristics is disclosed in Japanese Patent Unexamined Publication No. 2000-200448.

This medium is constituted by three magnetic layers of a reproduction layer, an intermediate layer, and a recording layer, and is a double mask magnetically induced super resolution medium (Double mask Rear Aperture Detection: D-RAD medium) in which a low temperature mask (called a front mask) is formed in a low temperature region of a temperature distribution formed in a beam spot, and a high temperature mask (called a rear mask) is formed in a high temperature region.

According to this medium, a recording mark having a length of 0.38 µm and formed on a land substrate of a track pitch of 0.9 µm can be reproduced by a reproduction magnetic field of 300 Oe or less.

Besides, in order to further increase the recording density of a recording medium, it is necessary to shorten a track pitch of the medium in a radius direction and to shorten a mark length of a recording mark.

As one method of shortening the track pitch to increase the density, there is a method in which a land groove substrate is used, and recording marks are formed on both a land and a groove.

Even if the land groove substrate is applied to the D-RAD medium, if it is a high density medium of about 2.3 GB/3.5 inches, it is possible to form a medium in which cross talk from an adjacent track is hardly generated.

However, in the case where the track pitch of the land groove substrate is shortened to further increase the capacity of a medium, there arises a problem that cross talk from an adjacent track can not be neglected and a reproduction power margin becomes narrower than a design value.

For example, in the case where a high density D-RAD medium of a track pitch of about 0.50 µm is reproduced by an optical system of an LD wavelength of 660 nm and NA=0.55, the cross talk from an adjacent track is generated to such a degree that it can not be neglected, which becomes a problem at a practical use level of recording and reproduction of data.

Figure 12:
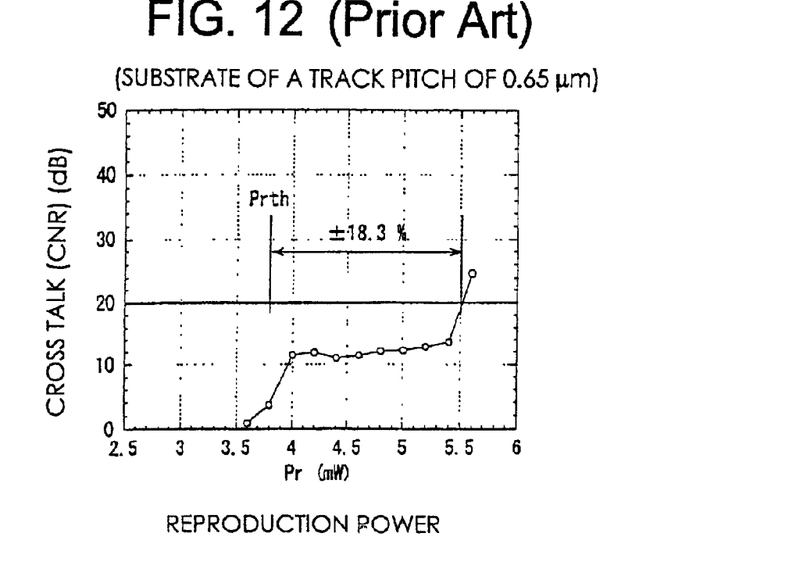
FIG. 12 is a graph of the dependency of cross talk of a conventional D-RAD medium upon reproduction power (substrate of a track pitch of 0.65 $\mu$m).
Figure 13:
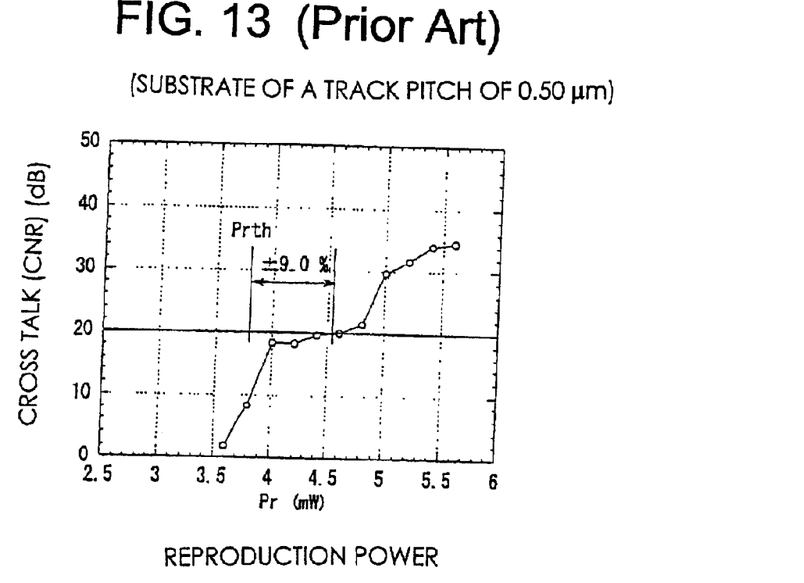
FIG. 13 is a graph of the dependency of cross talk of a conventional D-RAD medium upon reproduction power (substrate of a track pitch of 0.50 $\mu$m).

FIG. 12 and FIG. 13 are graphs each explaining the dependency of cross talk of a conventional D-RAD medium upon reproduction power (Pr).

The vertical axis indicates a decibel value CNR (dB) equivalent to the amount of generated cross talk, and the horizontal axis indicates a reproduction power (mW).

FIG. 12 relates to a land groove substrate of a track pitch of 0.65 µm, and FIG. 13 relates to a land groove substrate of a track pitch of 0.50 µm.

In the graphs, in the case where 8T marks having the shortest mark length of 0.300 µm are stored in a groove adjacent to a land, a decibel value of a signal leaking into the land by the cross talk is measured.

According to FIG. 12, even if the reproduction power Pr is raised from 3.6 mW to about 5.5 mW, the cross talk is 20 dB or less which does not become a problem in practical use.

Besides, when a region from Pr=3.8 mW as the rising (Prth) of CNR at which reproduction can be performed to a point at which the cross talk is 20 dB or less (to Pr=5.5 mW) is considered to be a reproduction power margin, in the case of FIG. 12, there is a reproduction power margin of ±18.3%.

On the other hand, in the land groove substrate of a track pitch of 0.50 µm shown in FIG. 13, the cross talk exceeds 20 dB when the reproduction power Pr is approximately 4.5 mW.

That is, high cross talk is observed at the high Pr side, and the influence of the cross talk becomes high even in a region of lower reproduction power. In FIG. 13, the reproduction power margin is decreased to about ±9.0%.

It is conceivable that the high cross talk is observed at the high Pr side like this because of the following mechanism.

Figure 14:
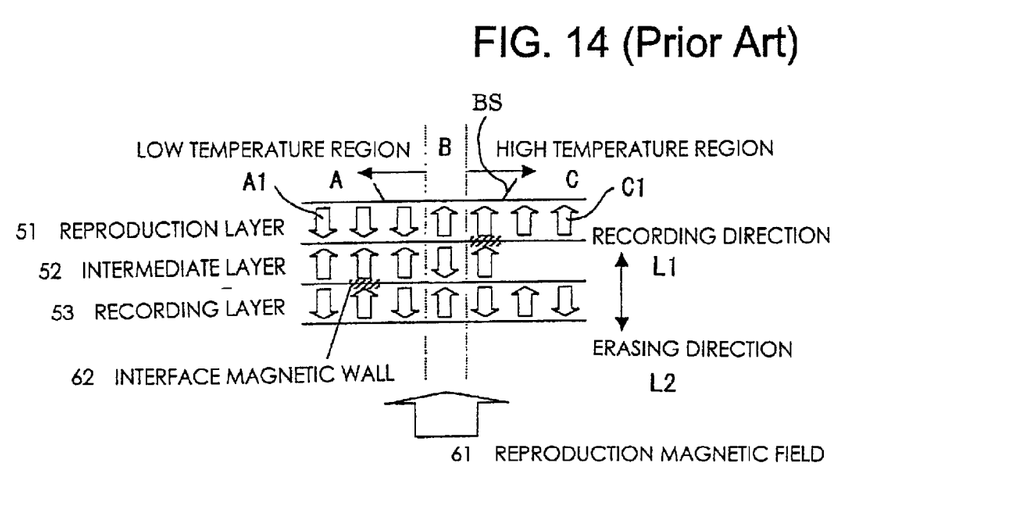
FIG. 14 is an explanatory view of a magnetization state at the time of reproduction of the conventional D-RAD medium.

FIG. 14 is an explanatory view of magnetization states of the respective layers at the time of reproduction of a conventional D-RAD medium.

FIG. 14 shows the directions of magnetization of a reproduction layer 51, an intermediate layer 52, and a recording layer 53 as three magnetic layers of the D-RAD medium.

In a state where a reproduction magnetic field 61 is applied from below, a light beam is irradiated to the magnetic layers from above. FIG. 14 shows the magnetization states in the vicinity of a beam spot BS where the light beam is irradiated, and in the case where this medium is moved in the upper right direction in the drawing, a temperature distribution in the beam spot is divided into three regions (a low temperature region A, an intermediate temperature region B, and a high temperature region C).

With respect to the direction of magnetization, the up direction indicates a recording direction L1, and the down direction indicates an erasing direction L2.

As shown in FIG. 14, when the reproduction magnetic field 61 is applied in the recording direction L1, in the low temperature region A within the beam spot, all the magnetization of the intermediate layer 52 is directed in the external magnetic field direction L1, the magnetization of the reproduction layer 51 exchange-coupled to the intermediate layer 52 is directed in the erasing direction L2, and a low temperature mask A1 is formed in the reproduction layer 51. At this time, irrespective of the direction of magnetization of the recording layer 53 of the low temperature region, the directions of magnetization of the intermediate layer 52 are made uniform, and an interface magnetic wall 62 is produced between the magnetization of the recording layer 53 in the recording direction L1 and the intermediate layer 52.

On the other hand, in the high temperature region C within the beam spot, since the magnetization of the intermediate layer 52 reaches the Curie temperature, spontaneous magnetization disappears (expressed by a blank portion), and exchange-coupling force to the reproduction layer 51 is cut. Accordingly, in this high temperature region C, all the magnetization of the reproduction layer 51 is made uniform in the external magnetization direction L1, that is, in the reproduction layer 51, all the spontaneous magnetization is directed in the recording direction L1, and a high temperature mask C1 is formed.

Besides, in the intermediate temperature region B, a recording mark recorded in the recording layer 53 is transferred to the reproduction layer 51 by exchange-coupling through the intermediate layer 52. Here, the magnetization direction of the recording mark transferred to the reproduction layer 51 is the recording direction L1. That is, in this case, the magnetization direction in the intermediate temperature region B is directed in the same direction as the high temperature mask C1.

Figure 15:
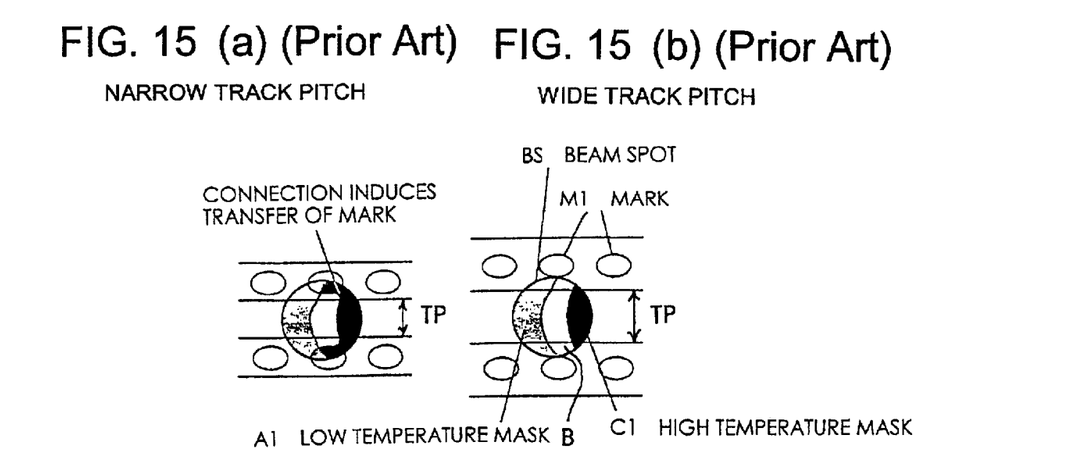
FIGS. 15(a) and 15(b) are explanatory views of states where cross talk is generated in the conventional D-RAD medium.

FIGS. 15(a) and 15(b) are views for explaining a state of generation of cross talk in the case where the D-RAD medium is seen from above.

FIG. 15(b) shows the case where a track pitch TP is relatively wide, and the high temperature mask C1 in the beam spot BS does not overlap an adjacent recording mark M1, so that the cross talk is not generated.

On the other hand, as shown in FIG. 15(a), in the case where the track pitch TP is narrower than that of FIG. 15(b), there is also a case where the high temperature mask C1 made of spontaneous magnetization directed in the recording direction L1 overlaps an adjacent recording mark M1.

It is conceivable that at this time, the recording marks M1 which must be naturally masked are connected to each other and transfer is performed to make the directions uniform in the same magnetization direction L1 as the high temperature mask C1, and this has, as a cross talk signal, an effect on the reproduction of a recording mark of an adjacent track.

On the other hand, even in the case where the mask of the high temperature region does not overlap a mark of an adjacent track, it is conceivable that the mark of the adjacent track is transferred by the following principle.

Figure 16:
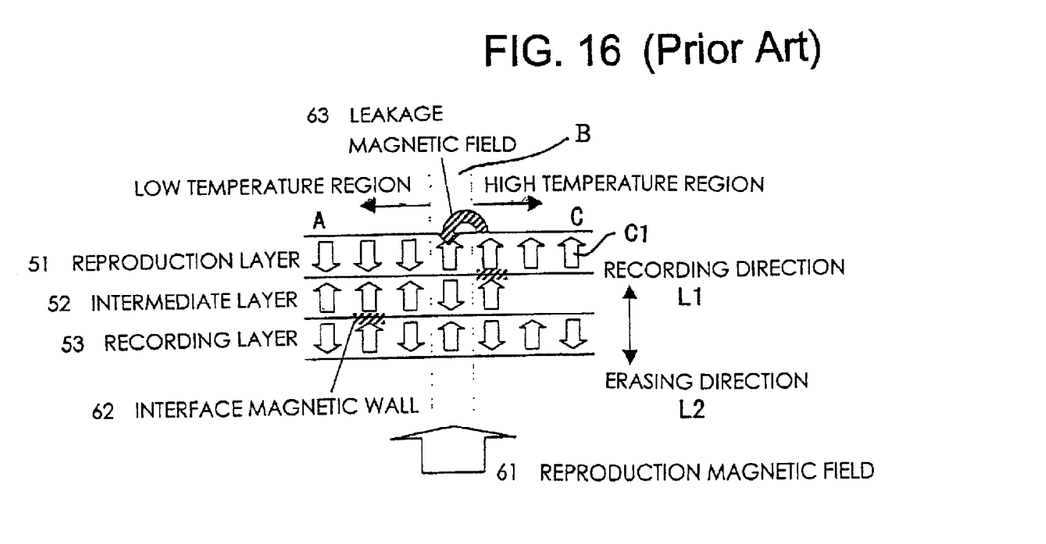
FIG. 16 is an explanatory view of a leakage magnetic field generated at the time of reproduction in the conventional D-RAD medium.

As shown in FIG. 16, from the magnetization of the reproduction layer 51 of the high temperature region C directed in the recording direction L1 by the reproduction magnetic field 61, a leakage magnetic field 63 is generated in the direction indicated by a slant arrow in the drawing. This is the same as the magnetization direction of the intermediate layer 52 in the intermediate temperature region B at the time of the transfer state, and acts in the direction to facilitate the transfer. The leakage magnetic field 63 is generated to become high in proportion to the intensity of the magnetization of the reproduction layer 51 and becomes weak in inverse proportion to the square of the distance.

Figure 17:
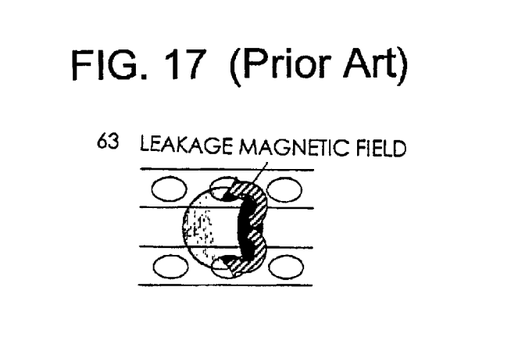
FIG. 17 is a view for explaining an influence of a leakage magnetic field on an adjacent track in the conventional D-RAD medium.

In general, since the reproduction layer 51 of the D-RAD medium uses a material in which the value of saturation magnetization increases in proportion to the temperature up to about 200° C., it is conceivable that as the mask of the high temperature region C is formed and approaches the recording mark M1 of the adjacent track, the leakage magnetic field 63 from the mask of the reproduction layer 51 of the high temperature region C acts in the direction to facilitate the transfer, and as shown in FIG. 17, it has an effect as cross talk on the adjacent track.

Like this, in the conventional D-RAD medium, when the track pitch is made narrow, the cross talk due to the high temperature mask having the spontaneous magnetization in the reproduction layer is generated, so that there is a limit in realization of high density by narrowing the track pitch.

SUMMARY OF THE INVENTION

According to the present invention, the magneto-optical recording medium includes at least three magnetic layers of a first magnetic layer, a second magnetic layer and a third magnetic layer, in which a recording mark recorded in the third magnetic layer by irradiation of a light beam is transferred through the second magnetic layer as formed above the third magnetic layer to the first magnetic layer formed above the second magnetic layer for reproduction, wherein the first magnetic layer includes a high temperature mask having no spontaneous magnetization in a region where its temperature becomes a predetermined temperature or higher.

According to this, cross talk from an adjacent track can be reduced, and recording noise and erase noise can be reduced even if a track pitch is made narrower than a conventional medium.

DESCRIPTION OF THE PREFERRED EMBODIMENTS

The present invention provides a magneto-optical recording medium in which cross talk to an adjacent track can be reduced, even in the case where a track pitch is made narrower than a conventional D-RAD medium, and the generation of a magnetic noise resulting from the formation of a high temperature mask is suppressed because spontaneous magnetization does not exist at a high temperature.

Here, when a metal is added to the first magnetic layer so that the Curie temperature of the first magnetic layer becomes almost equal to the Curie temperature of the second magnetic layer, the high temperature mask having no spontaneous magnetization is formed.

A magnetic material capable of adjusting the Curie temperature and the compensation temperature of the first magnetic layer is used as the metal. The metal is one of Cr, Mn, MnCr and Nb.

In the present invention, a material such as glass or polycarbonate (PC) resin can be used for a substrate. It is preferable that an under layer is formed on the substrate, and the under layer is a dielectric layer made of a material having properties of enhancement of a Kerr rotation angle, and especially, a material such as SiN or AlN can be used.

As the first magnetic layer, a material which mainly contains GdFeCo and is added with a metal material such as Cr or Mn, can be used.

As the second magnetic layer, a material which mainly contains GdFeCo or GdFe and is added with a metal material such as Si, Al or Ti, can be used.

As the third magnetic layer, TbFeCo or DyFeCo can be used.

In the present invention, the first magnetic layer means a so-called reproduction layer, and the region of the first magnetic layer where the temperature becomes the predetermined temperature or higher means a high temperature region as a region where a mask for prohibiting readout of information at the time of reproduction of a recording mark is formed. Although the predetermined temperature can not be defined as a constant value, it is, for example, a temperature of about 200° C.

A mask formed in the high temperature region of the first magnetic layer is called a high temperature mask.

The magneto-optical recording medium of the present invention can be structured by stacking a high reflectivity layer, the first magnetic layer, the second magnetic layer, and the third magnetic layer on a substrate in this order. Besides, an under layer may be made to intervene between the substrate and the high reflectivity layer.

Besides, the magneto-optical recording medium may be structured such that a fourth magnetic layer, the first magnetic layer, the second magnetic layer, and the third magnetic layer are stacked on a substrate in this order, and the fourth magnetic layer is made of the same material as the second magnetic layer. An under layer may be made to intervene between the substrate and the fourth magnetic layer.

Further, the magneto-optical recording medium may be structured such that a high reflectivity layer, the fourth magnetic layer, the first magnetic layer, the second magnetic layer, and the third magnetic layer are stacked on the substrate in this order. Also in this case, an under layer may be made to intervene between the substrate and the high reflectivity layer.

Here, a material having a property of increasing the amount of reflecting light can be used for the high reflectivity layer, and for example, any one of AgPdCu, Al, AlCr and AlTi can be used.

Besides, as the substrate, a land substrate including recording marks only on a land, or a land groove substrate including recording marks on both a land and a groove can be used.

Hereinafter, the present invention will be described in detail on the basis of embodiments shown in the drawings. Incidentally, the present invention is not restricted by this.

Figure 1:
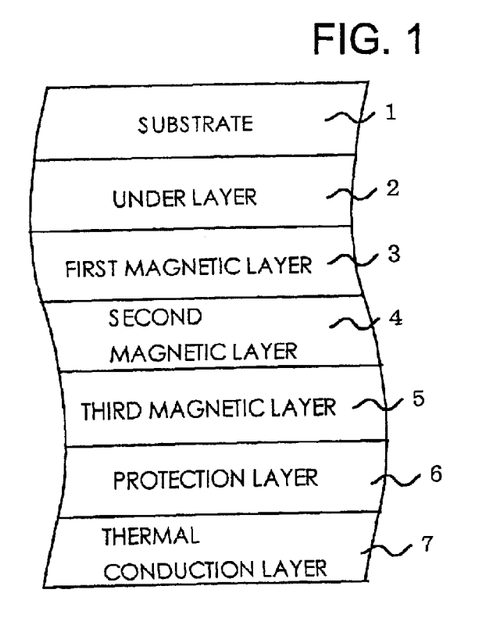
FIG. 1 is a structural view of a magneto-optical recording medium of a first embodiment of the present invention.

FIG. 1 is a sectional structural view of a magneto-optical recording medium (hereinafter often simply referred to as a disk) of an embodiment of the present invention. Here, a substrate 1 is a land groove substrate of a track pitch of 0.5 $\mu$m.

A disk of this invention can be formed by sequentially forming an under layer 2, a first magnetic layer 3, a second magnetic layer 4, a third magnetic layer 5, a protection layer 6, and a thermal conduction layer 7 on the substrate 1 by a DC sputtering method. A light beam is irradiated to the disk from above the substrate 1, and a reproduction magnetic field 61 is applied from the side of the thermal conduction layer 7.

Here, although a glass material is used for the substrate 1, and SiN is used for the under layer 2 and the protection layer 6, the invention is not limited to this.

The first magnetic layer 3 corresponds to the conventional reproduction layer 51, the second magnetic layer 4 corresponds to the conventional intermediate layer 52, and the third magnetic layer 5 corresponds to the conventional recording layer 53.

The material of the first magnetic layer 3 is Gd21.0Fe55.9Co14.4Cr8.7, the material of the second magnetic layer is Gd28.5Fe65.1Co4.3Si2.2, and the material of the third magnetic layer is Tb22.3Fe61.4Co16.3.

The thermal conduction layer 7 uses AlCr.

Sputtering conditions for the formation of the SiN layers 2 and 6 are such that Ar and $N_2$ gas pressure is 0.8 Pa, and input electric power is 0.8 kW, and sputtering conditions for the formation of the magnetic layers 3, 4 and 5 and the thermal conduction layer 7 are such that Ar gas pressure is 0.5 to 1.0 Pa, and input electric power is 0.5 to 0.8 kW. Incidentally, the degree of attained vacuum was made $5 \times 10^{-5}$ Pa or less.

The film thicknesses of the respective layers are made 90 nm in the under layer, 40 nm in the first magnetic layer, 40 nm in the second magnetic layer, 50 nm in the third layer, 60 nm in the protection layer, and 15 nm in the thermal conduction layer in sequence from the side of the substrate 1.

The first magnetic layer 3 is a GdFeCoCr film (film thickness of 40 nm) showing vertical magnetization from room temperature to the Curie temperature, its compensation temperature $T_{comp}$ is 90° C., and the Curie temperature $T_{c1}$ is about 210° C. Here, added Cr is an antiferromagnetic metal, and is added to adjust the Curie temperature Tc and the compensation temperature $T_{comp}$ of the first magnetic layer 3.

The present invention is characterized in that a predetermined amount of Cr is added, so that the Curie temperature Tc of the first magnetic layer (reproduction layer) 3 is made almost coincident with the Curie temperature of the second magnetic layer (intermediate layer) 4.

As a material added to the first magnetic layer 3, although any material may be used as long as it can adjust the compensation temperature $T_{comp}$ and the Curie temperature Tc in the direction to make them approach each other, a metal having a property of antiferromagnetism or oxidation suppression, such as Mn, MnCr or Nb, can be used in addition to Cr. However, a nonmagnetic metal such as Si or Al can not adjust the compensation temperature $T_{comp}$ and the Curie temperature Tc, it can not be adopted. Besides, it is preferable that the amount of added Cr is in a range in which the same level as the Curie temperature of the intermediate layer is obtained.

The second magnetic layer 4 is an in-plane magnetization film (GdFeCoSi film: film thickness of 50 nm) of a rare earth magnetization rich (hereinafter referred to as RE rich) composition in which in a single layer, the compensation temperature $T_{comp}$ can not be seen up to the Curie temperature, and the Curie temperature is 210° C. This second magnetic layer has vertical magnetization at a predetermined temperature or higher to transfer information of the recording layer to the reproduction layer in the stacked film. Here, Si is added to lower the Curie temperature Tc, and in addition to Si, Al, Ti or the like as a nonmagnetic metal may be added. It is preferable that the amount of added Si is in such a range that a high temperature mask can be formed at about 200° C.

The third magnetic layer 5 has the compensation temperature $T_{comp}$ in the vicinity of room temperature (from about 10° C. to 35° C.) and is a TbFeCo film (film thickness of 60 nm) of a transition metal magnetization rich (hereinafter referred to as TM rich) composition showing vertical magnetization up to the Curie temperature.

Figure 2:
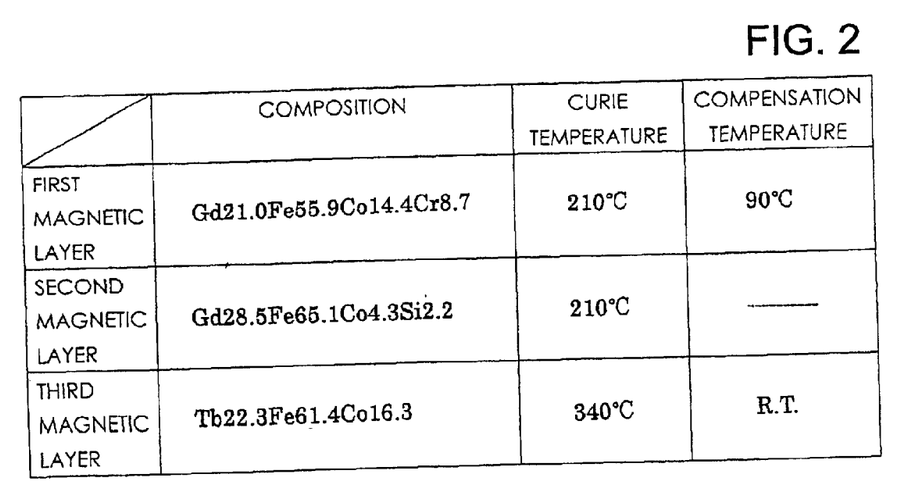
FIG. 2 is a view showing the composition, Curie temperature and compensation temperature of each magnetic layer of the present invention.

FIG. 2 shows the composition, Curie temperature Tc, and compensation temperature $T_{comp}$ of each magnetic layer.

Figure 3:
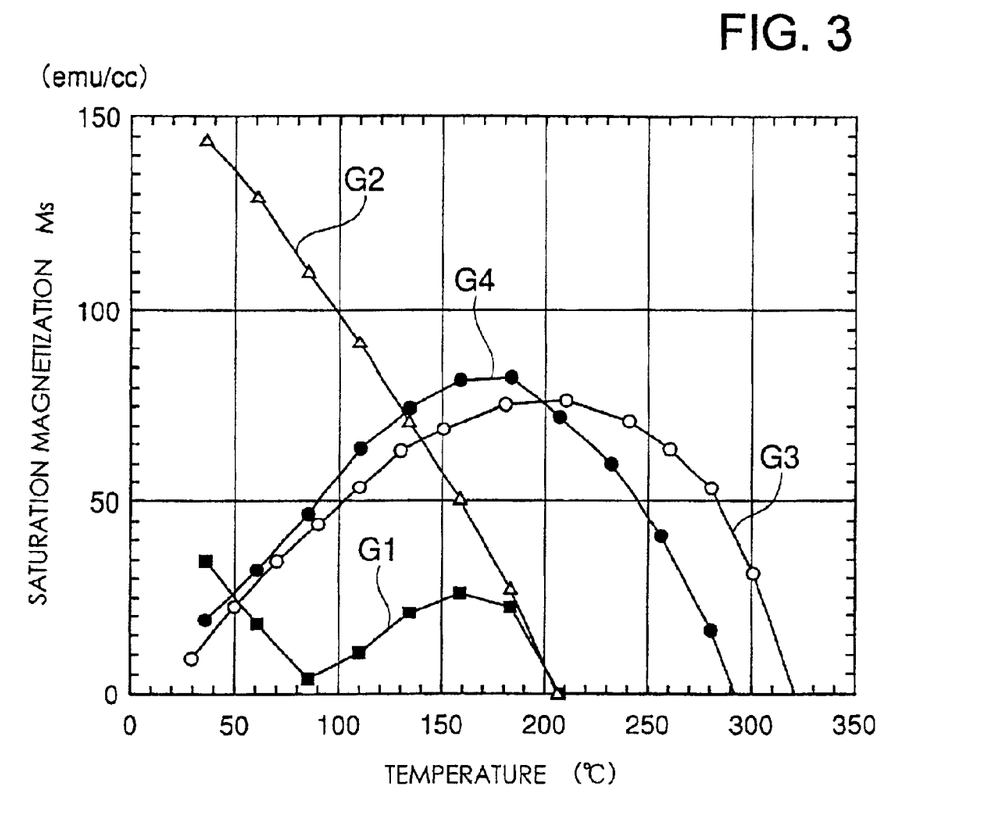
FIG. 3 is a graph of a relation between saturation magnetization and temperature in a reproduction layer and an intermediate layer.

FIG. 3 shows a graph of a relation between saturation magnetization Ms and temperature in the reproduction layer 3 and the intermediate layer 4. Here, the horizontal axis indicates the temperature (° C.) and the vertical axis indicates the saturation magnetization (emu/cc).

According to a characteristic curve G1 of the reproduction layer 3 of the present invention, it is understood that the Curie temperature is 210° C., and the compensation temperature $T_{comp}$ is 90° C.

In FIG. 3, according to a characteristic curve G3 of a conventional reproduction layer (GdFeCo) which does not contain Cr, the compensation temperature $T_{comp}$ is 20° C., and the Curie temperature is 320° C., and as compared with the characteristic curve G1 of the reproduction layer (GdFeCoCr) of the present invention, although the compensation temperature $T_{comp}$ is low and the Curie temperature is high, the intensity of the saturation magnetization Ms is generally high.

Besides, both the Curie temperature of the characteristic curve G1 of the reproduction layer of the present invention and the Curie temperature Tc of a characteristic curve G2 of the intermediate layer are about 210° C., and they are almost coincident with each other.

Besides, since the intensity of the saturation magnetization Ms of the characteristic curve G1 of the reproduction layer 3 of the present invention is low as compared with the characteristic curve G3 of the conventional reproduction layer, there is an effect that a leakage magnetic field from the reproduction layer is low.

Although FIG. 3 shows also a characteristic curve G4 of a GdFeCoSi layer as the reproduction layer added with Si for comparison, since Si is used instead of Cr, the compensation temperature $T_{comp}$ is as low as about 20° C. Although the Curie temperature can be lowered further by increasing the amount of added Si, $T_{comp}$ can not be raised. According to this characteristic curve G4, since it is changed similarly to the characteristic curve G3 of the conventional reproduction layer, even if Si is added, it is impossible to make an adjustment to lower the Curie temperature Tc and to raise the compensation temperature $T_{comp}$.

Next, the evaluation of cross talk of the disk of the present invention shown in FIG. 1 will be described.

Figure 4:
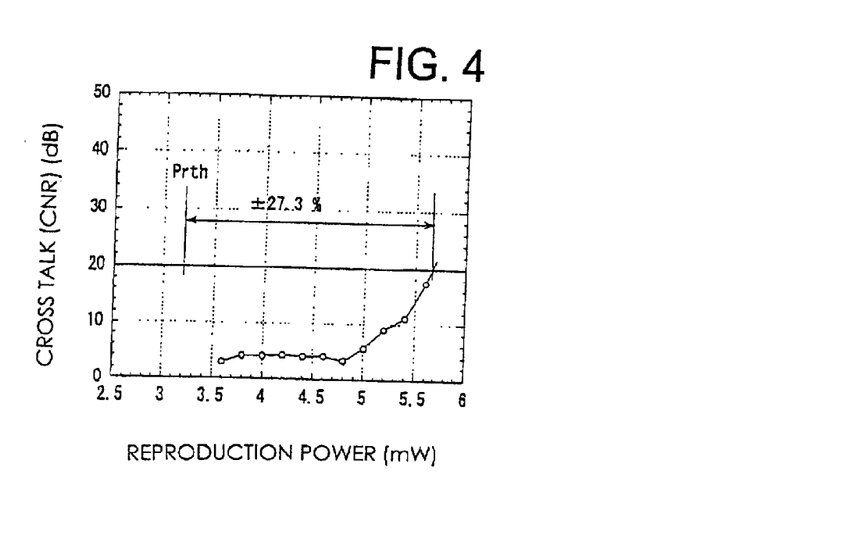
FIG. 4 is a graph of the dependency of cross talk of a disk of the present invention upon reproduction power (substrate of a track pitch of 0.50 μm).

FIG. 4 is a graph of the dependency of cross talk of the magneto-optical recording medium of the present invention upon reproduction power. This shows a result of measurement of CNR leaking to a land, obtained by using a tester of an LD wavelength of 660 nm and NA=0.55, in the case where 8T marks are recorded in a groove adjacent to the land.

According to FIG. 4, cross talk of 20 dB is generated at the reproduction power Pr of about 5.7 mw. That is, irrespective of the fact that the land groove substrate of a track pitch of 0.5 µm smaller than a conventional one is used, the reproduction power margin becomes about ±27.3%, and it is understood that the influence of cross talk on an adjacent mark can be suppressed more effectively than the conventional D-RAD medium shown in FIG. 13.

As described above, in the magneto-optical recording medium of the present invention, in order to reduce the cross talk, Cr is added as the composition material for constituting the reproduction layer so that the Curie temperature of the reproduction layer 3 is almost coincident with that of the intermediate layer 4. It is conceivable that the cross talk is reduced, in other words, the reproduction power margin is increased because spontaneous magnetization does not exist in a high temperature mask formed in the high temperature region C of the reproduction layer 3.

Figure 5:
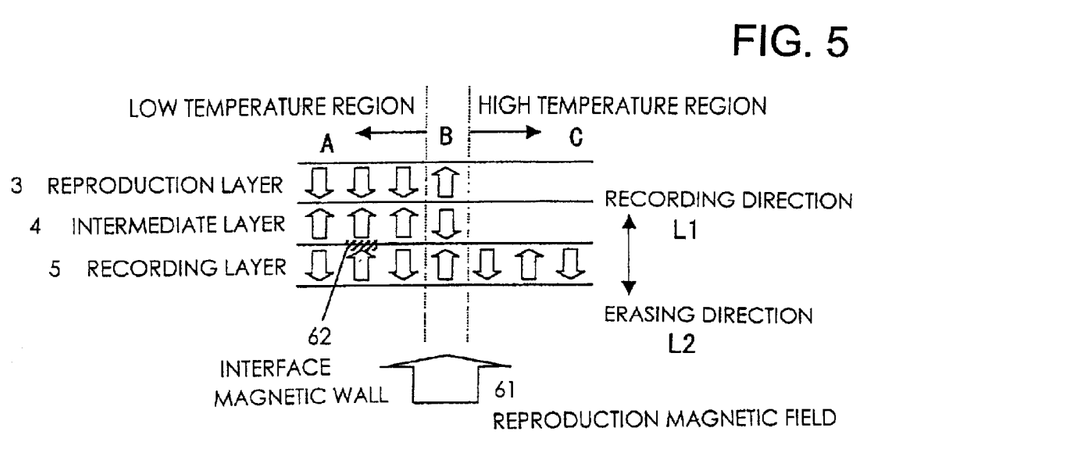
FIG. 5 is an explanatory view of a magnetization state at the time of reproduction of a disk of the present invention.

FIG. 5 is an explanatory view of a magnetization state at the time of reproduction of the magneto-optical recording medium of the present invention.

As compared with the conventional D-RAD medium shown in FIG. 14, in a low temperature region A, similarly to the prior art, a low temperature mask is formed in the reproduction layer by a reproduction magnetic field 61, and the magnetization of the recording layer is transferred to the reproduction layer in an intermediate temperature region B. However, the magnetization state of FIG. 5 of the present invention is different from the prior art in that the spontaneous magnetization does not exist (expressed by blank portions) in the reproduction layer 3 and the intermediate layer 4 of a high temperature region C.

Accordingly, it can be said that the high temperature mask formed in the high temperature region C is the mask in which the spontaneous magnetization does not exist.

Since this high temperature mask is the mask in which the spontaneous magnetization does not exist, the leakage magnetic field 63 as explained in FIGS. 16 and 17 is not generated, and transfer of a recording mark of an adjacent track is not induced. That is, it can be said that the cross talk to the adjacent track is not generated. Besides, since the spontaneous magnetization does not exist in the high temperature region C of the reproduction layer 3 of FIG. 5, nothing is entered in this, however, a high temperature mask for prohibiting readout of information is formed here. This can be confirmed by the following reproduction waveform.

Figure 6:
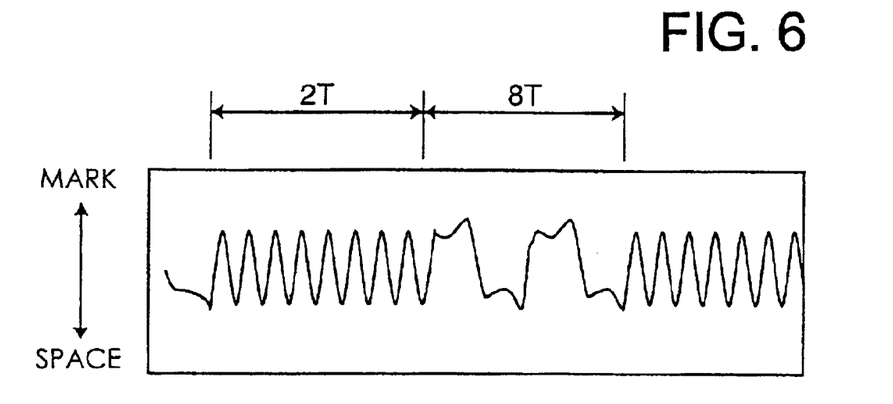
FIG. 6 is a view showing a reproduction waveform of a signal of a 2T8T pattern in a disk of the present invention.

FIG. 6 shows a result of observation of a reproduction waveform in the case where a pattern of continuous recording marks of 2T and 8T is recorded by optical modulation recording in the magneto-optical recording medium of the present invention.

Figure 7:
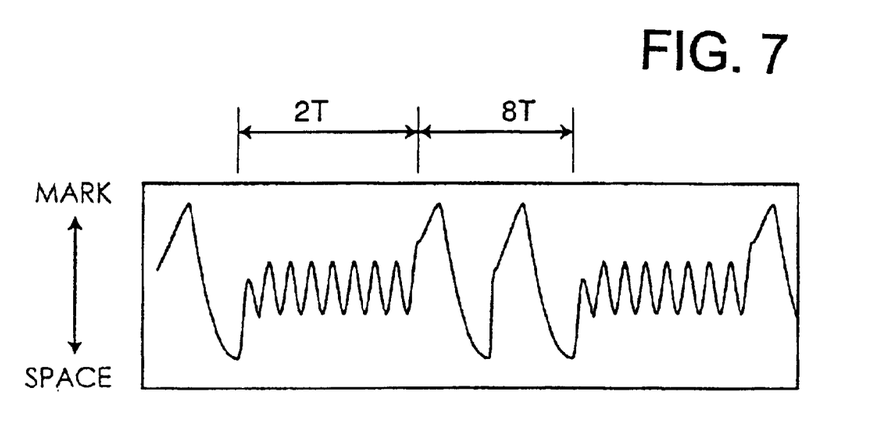
FIG. 7 is a view showing a reproduction waveform of a signal of a 2T8T pattern in a conventional disk in which a mask does not exist in a high temperature region.

Besides, FIG. 7 shows a result of observation of a reproduction waveform of 2T8T continuous marks of a medium in which only a low temperature mask exists and a high temperature mask is not formed in the high temperature region in the conventional disk. The horizontal direction indicates a time axis, and the upper part in the vertical direction indicates that a mark is reproduced and the lower part indicates that a space is reproduced.

In FIG. 7, the amplitude of a reproduction signal of the 2T mark after the reproduction of the 8T space is decreased. On the other hand, in FIG. 6, it is understood that even after the 8T space is reproduced, the amplitude of the 2T mark is not deteriorated.

In the conventional disk of FIG. 7, it is conceivable that since waveform interference occurs at the time of reproduction of the 2T mark by cross talk in the circumferential direction, the amplitude becomes small. On the other hand, in the disk of the present invention shown in FIG. 6, the waveform interference of the reproduction signals hardly occurs, and it can be said that the resolution is high, so that the waveform having no deterioration in the amplitude can be obtained, and it is understood that the so-called mask is formed in the high temperature region C.

That is, from the above result, in the disk of the present invention shown in FIG. 1, since the high temperature mask having no spontaneous magnetization is formed in the high temperature region C of the reproduction layer 3, a reproduction signal having a sufficient reproduction power margin is obtained and the cross talk can be reduced.

Next, noise resulting from the formation of the high temperature mask will be described. In general, when the high temperature mask is formed, a noise component is generated due to the fluctuation of the spontaneous magnetization. If this noise component is large, signal quality (SNR) is influenced, and accordingly, it is desirable that the component is as small as possible.

When the noise component in the case where a recording mark of 0.300 μm was recorded in the recording layer 5, was measured by using a magneto-optical recording and reproducing apparatus (MO tester), in the disk of the present invention of FIG. 1, the recording noise was 5.64 mV, and the erase noise was 5.08 mV.

On the other hand, in the conventional D-RAD medium, the recording noise was 9.04 mV, and the erase noise was 6.35 mV.

That is, in the medium of the present invention, as compared with the prior art, the recording noise is reduced by a factor of 1/2.6 time (8.4 dB). Accordingly, it can be said that both the recording noise and the erase noise can be greatly reduced as compared with the conventional medium.

It is conceivable that this is caused from the circumstances that since the high temperature mask having no spontaneous magnetization is formed in the high temperature region of the reproduction layer 3, the mask noise resulting from magnetization rotation generated when magnetization of the reproduction layer 3 is directed in the external magnetization direction is not generated.

So far, as the first embodiment, the embodiment has been described in which the layer added with Cr is formed in the first magnetic layer (reproduction layer 3), and the high temperature mask having no spontaneous magnetization is formed in the high temperature region C of the reproduction layer, so that the cross talk is reduced. However, even in a disk containing, instead of Cr, metal of any one of Mn, MnCr and Nb as described before, it was possible to obtain a similar effect.

Besides, in the first embodiment, although the amount of addition of Cr is made 8.7%, the invention is not limited to this, and as long as the composition range was such that approach to the Curie temperature of the intermediate layer was achieved, it was possible to obtain a similar effect of decreasing cross talk.

(Second Embodiment)

Figure 8:
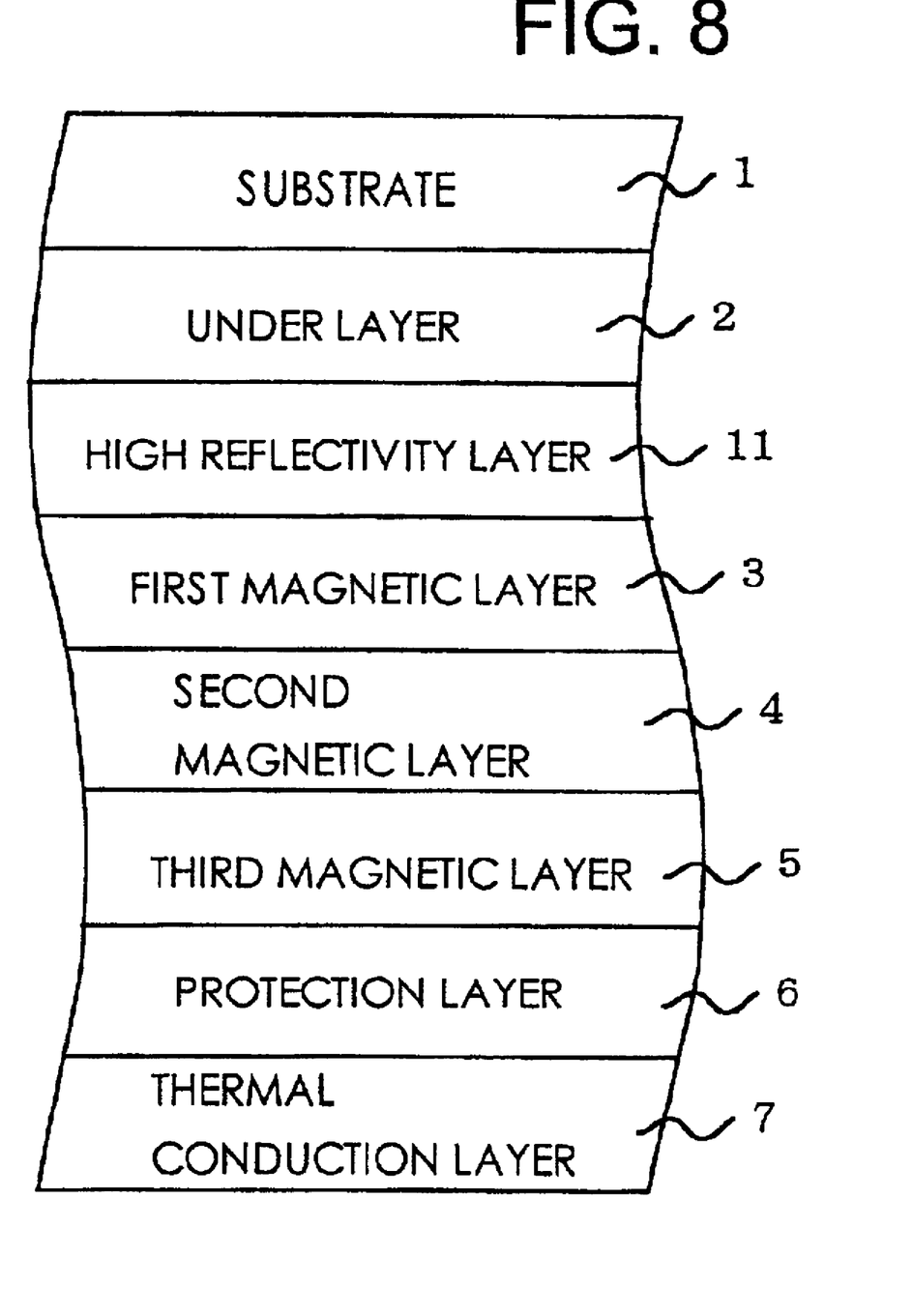
FIG. 8 is a structural view of a magneto-optical recording medium of a second embodiment of the present invention.

FIG. 8 is a structural view of a disk in which a high reflectivity layer 11 is provided between an under layer 2 and a first magnetic layer 3 with respect to the disk formed in the first embodiment.

When the high reflectivity layer 11 is added, an MO amplitude having an influence on a carrier (S of signal quality SNR) can be amplified.

As the high reflectivity layer 11, AgPdCu can be used. Although the film thickness constitution and film formation conditions of films other than the high reflectivity layer 11 may be the same as the first embodiment, the AgPdCu layer was also formed under the same condition as the thermal conduction layer of the first embodiment. Besides, as the high reflectivity layer 11, Al, AlCr, AlTi or the like having high reflectivity may be used in addition to AgPdCu.

Besides, if the high reflectivity layer 11 is excessively thick, magnetization information of the first magnetic layer 3 can not be reproduced, so that the thickness must be made such that a predetermined amount of light beam can penetrate. Here, the AgPdCu layer is formed to a thickness of about 2 nm.

In the disk of the first embodiment, since the Curie temperature of the first magnetic layer is set lower than that of the prior art, the Kerr rotation angle θk is slightly lowered. Then, when the layer having high reflectivity R such as the AgPdCu layer 11 is added, the MO amplitude observed as an amount proportional to R×θk can be restored, and as a result, the Kerr rotation angle can also be raised.

Figure 9:
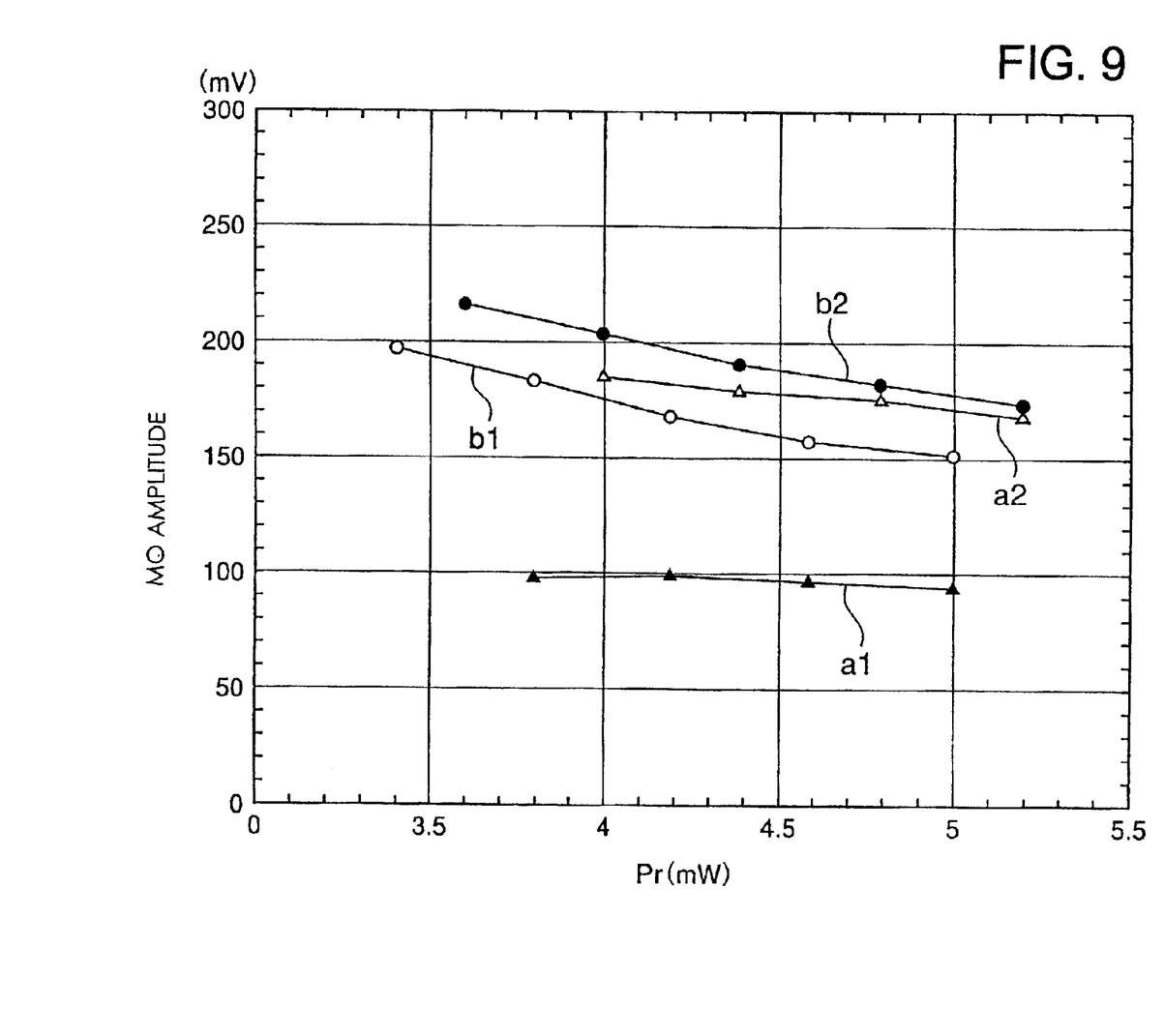
FIG. 9 is a graph of a relation between MO amplitude and reproduction power of each magneto-optical recording medium.

FIG. 9 shows a graph of a relation between the MO amplitude and reproduction power of each magneto-optical recording medium. Here, a graph a1 relates to the magneto-optical recording medium of the first embodiment of the present invention shown in FIG. 1, a graph a2 relates to the magneto-optical recording medium of the second embodiment of the present invention shown in FIG. 8, a graph b1 relates to the conventional D-RAD medium shown in FIG. 14, and a graph b2 relates to a medium of the conventional D-RAD medium added with a high reflectivity layer.

The horizontal axis indicates the reproduction power Pr, and the vertical axis indicates the MO amplitude. According to this graph, it is understood that since the disk of the graph a2 and the disk of the graph b2 are added with the high reflectivity layers to the disk of the graph a1 and the disk of the graph b1, respectively, the MO amplitude is increased. That is, by adding the high reflectivity layer 11, the MO amplitude is increased in both the conventional D-RAD medium and the disk of the second embodiment of the present invention.

Further, when the graph a2 is compared with the graph b2, in the disk of the second embodiment, it can be said that the MO amplitude can be restored to almost the same degree as the conventional disk. Besides, in the disk of the second embodiment, the reproduction power margin to the cross talk becomes about ±28.2%, and the cross talk can be reduced to the same degree as the first embodiment.

(Third Embodiment)

Figure 10:
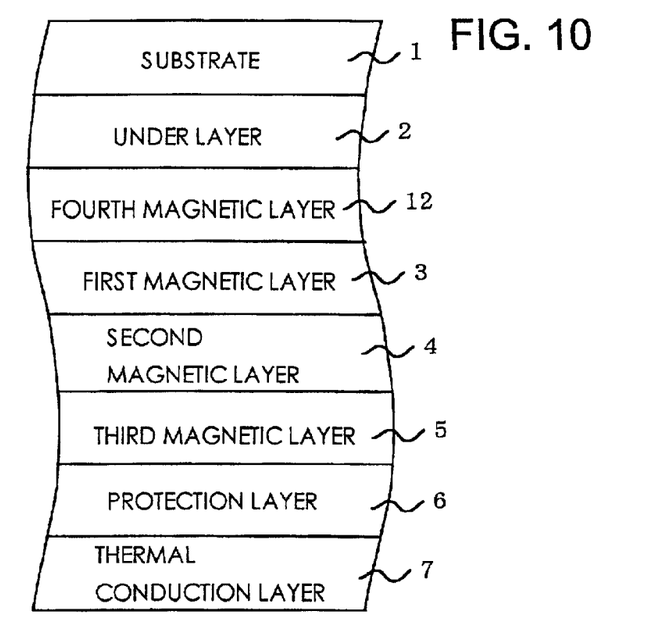
FIG. 10 is a structural view of a magneto-optical recording medium of a third embodiment of the present invention.

FIG. 10 is a structural view of a magneto-optical recording medium of a third embodiment of the present invention. In this magneto-optical recording medium, a fourth magnetic layer 12 having the same composition as a second magnetic layer 4 is added between an under layer 2 and a first magnetic layer 3 with respect to the disk of the first embodiment shown in FIG. 1. Here, the fourth magnetic layer 12 is a GdFeCoSi layer having a thickness of about 30 nm and formed under the same condition as the second magnetic layer. The film thickness constitution and film formation conditions of the other films are the same as the first embodiment.

Here, the fourth magnetic layer 12 has a Kerr rotation angle θk larger than that of the first magnetic layer 3 by about 0.05° at a high temperature (about 150° C. to 200° C.). Thus, the MO amplitude of the disk can be amplified. According to the observation using an MO tester, the MO amplitude was larger than that of the first embodiment by about ten percents. The reproduction power margin to cross talk was about ±28.0% which was almost the same as the second embodiment.

Accordingly, also in this medium of the third embodiment, the effects of the reduction of cross talk, the guarantee of reproduction power margin, and the increase of MO amplitude can be similarly obtained.

(Fourth Embodiment)

Figure 11:
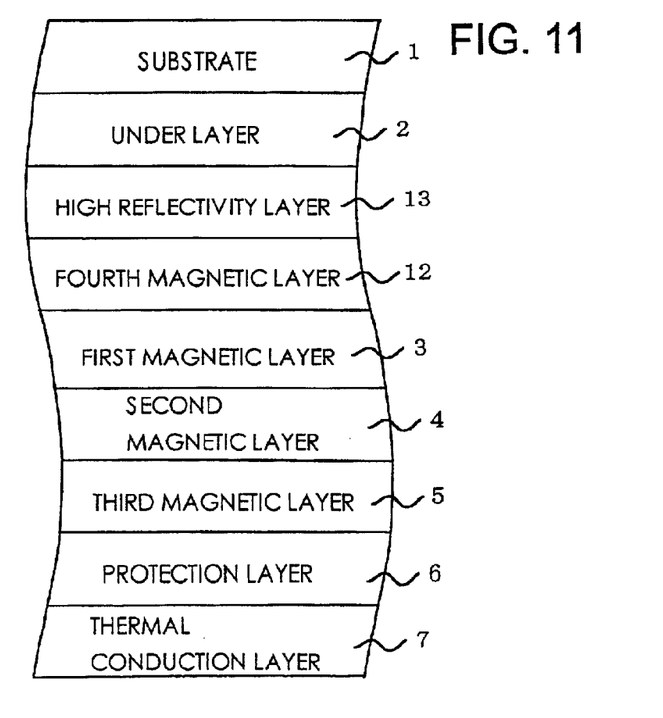
FIG. 11 is a structural view of a magneto-optical recording medium of a fourth embodiment of the present invention.

FIG. 11 is a structural view of a magneto-optical recording medium of a fourth embodiment of the present invention.

In this medium, a high reflectivity layer 13 is further added between an under layer 2 and a fourth magnetic layer 12 with respect to the magneto-optical recording medium of the third embodiment. Here, as the high reflectivity layer 13, the same AgPdCu layer as that shown in the second embodiment, or the like can be used. The film thicknesses and film formation conditions of the respective layers are made the same as those of the foregoing embodiments.

Here, in the case where the AgPdCu layer of about 2 nm was formed as the high reflectivity layer 13, the MO amplitude became larger than that of the third embodiment by about 20 percents. The reproduction power margin to the cross talk was ±28.5%.

Accordingly, also in this medium of the fourth embodiment, it is understood that the reduction of cross talk, the guarantee of sufficient power margin, and the improvement of MO amplitude can be realized with respect to a high density substrate having a narrow track pitch.

Besides, similarly to the first embodiment, also in this fourth embodiment, it was possible to reduce the noise due to the mask noise.

Incidentally, although the substrate is provided at the side of the first magnetic layer in the embodiment, the substrate may be provided at the side of the thermal conduction layer so that front illuminations can be made.

According to the present invention, since the high temperature mask having no spontaneous magnetization is formed in the high temperature region of the first magnetic layer (reproduction layer) for holding information for reproduction of a recording mark, even in the magneto-optical recording medium using a land groove substrate of a track pitch narrower than a conventional one, the reduction of cross talk from an adjacent track, and the reduction of recording noise and erase noise can be achieved.

Besides, since the Curie temperature of the first magnetic layer for carrying out reproduction of a recording mark is made almost coincident with the Curie temperature of the second magnetic layer (intermediate layer) for carrying out exchange-coupling of the recording mark, even in the magneto-optical recording medium using a land groove substrate having a track pitch narrower than a conventional one, the reduction of cross talk from an adjacent track, and the reduction of recording noise and erase noise can be achieved.

Further, since the magnetic material containing Cr is used for the first magnetic layer, even in the magneto-optical recording medium using a land groove substrate having a track pitch narrower than a conventional one, the reduction of cross talk from an adjacent track, and the reduction of recording noise and erase noise can be achieved.

Besides, in the case where the high reflectivity layer is provided to be in close contact with the under layer which is disposed to be in close contact with the substrate, in a land groove substrate of a narrow track pitch, the MO amplitude can be improved in addition to the reduction of generation of cross talk.

What is claimed is:

1. A magneto-optical recording medium comprising at least a first magnetic layer, a second magnetic layer and a third magnetic layer, in which a recording mark recorded in the third magnetic layer by irradiation of a light beam is transferred through the second magnetic layer formed above the third magnetic layer to the first magnetic layer formed above the second magnetic layer for reproduction, wherein the first magnetic layer receives said light beam earliest of the first, second, and third magnetic layers, wherein the first magnetic layer has first and second magnetic temperature regions, a temperature of the second temperature region being higher than that of the first region, wherein a mask is formed in the second temperature region, the mask having no spontaneous magnetization when the temperature of the second temperature region reaches a predetermined temperature or higher, and wherein the first magnetic layer is made of a magnetic material added with a metal so that a Curie temperature of the first magnetic layer becomes almost equal to a Curie temperature of the second magnetic layer.

2. A magneto-optical recording medium according to claim 1, wherein the metal is a magnetic material capable of adjusting the Curie temperature and compensation temperature of the first magnetic layer.

3. A magneto-optical recording medium according to claim 1, wherein the metal is selected from the group consisting of Cr, Mn, MnCr and Nb.

4. A magneto-optical recording medium according to any one of claims 1 to 3, wherein a reflectivity layer, the first magnetic layer, the second magnetic layer, and the third magnetic layer are stacked in this order.

5. A magneto-optical recording medium according to any one of claims 1 to 3, wherein a fourth magnetic layer, the first magnetic layer, the second magnetic layer, and the third magnetic layer are stacked in this order, and the fourth magnetic layer is made of the same material as the second magnetic layer.

6. A magneto-optical recording medium according to any one of claims 1 to 3, wherein a reflectivity layer, a fourth magnetic layer, the first magnetic layer, the second magnetic layer, and the third magnetic layer are stacked in this order, and the fourth magnetic layer is made of the same material as the second magnetic layer.

7. A magneto-optical recording medium according to any one of claims 1 to 3, wherein a reflectivity layer, the first magnetic layer, the second magnetic layer, and the third magnetic layer are stacked in this order on an under layer provided on a substrate, and the substrate is a land substrate including recording marks only on a land, or a land groove substrate including recording marks on both a land and a groove.

8. A magneto-optical recording medium according to any one of claims 1 to 3, to wherein a fourth magnetic layer, the first magnetic layer, the second magnetic layer, and the third magnetic layer are stacked in this order on an under layer provided on a substrate, and the fourth magnetic layer is made of the same material as the second magnetic layer, and the substrate is a land substrate including recording marks only on a land, or a land groove substrate including recording marks on both a land and a groove.

9. A magneto-optical recording medium according to any one of claims 1 to 3, wherein a reflectivity layer, a fourth magnetic layer, the first magnetic layer, the second magnetic layer, and the third magnetic layer are stacked in this order on an under layer provided on a substrate, and the fourth magnetic layer is made of the same material as the second magnetic layer, and the substrate is a land substrate including recording marks only on a land, or a land groove substrate including recording marks on both a land and a groove.

10. A magneto-optical recording medium according to claim 4, wherein the reflectivity layer is made of a material selected from the group consisting of AgPdCu, Al, AlCr and AlTi.

11. A magneto-optical recording medium according to claim 6, wherein the reflectivity layer is made of a material selected from the group consisting of AgPdCu, Al, AlCr and AlTi.

12. A magneto-optical recording medium according to claim 7, wherein the reflectivity layer is made of a material selected from the group consisting of AgPdCu, Al, AlCr and AlTi.

13. A magneto-optical recording medium according to claim 9, wherein the reflectivity layer is made of a material selected from the group consisting of AgPdCu, Al, AlCr and AlTi.

14. A magneto-optical recording medium according to claim 1, wherein the second magnetic layer includes at least one of GdFeCo and GdFe as a main component.

15. A magneto-optical recording medium according to claim 14, wherein the second magnetic layer further includes Si.

16. A magneto-optical recording medium according to claim 14, wherein the second magnetic layer further includes at least one of Al and Ti.

17. A magneto-optical recording medium according to claim 1, wherein the predetermined temperature is approximately 200 degrees centigrade.

* * * * *